(12) United States Patent
Sugiyama et al.

(10) Patent No.: US 6,200,224 B1
(45) Date of Patent: Mar. 13, 2001

(54) SLIDABLE CONSTANT VELOCITY UNIVERSAL JOINT

(75) Inventors: Tatsurou Sugiyama, Iwata; Shigeyoshi Ishiguro, Kagegawa; Hisaaki Kura, Iwata, all of (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 09/343,711

(22) Filed: Jun. 30, 1999

(30) Foreign Application Priority Data

Jul. 22, 1998 (JP) .................................................. 10-206772

(51) Int. Cl.$^7$ ....................................................... F16D 3/26
(52) U.S. Cl. ............................ 464/111; 464/112; 464/122
(58) Field of Search ................................... 464/111, 905, 464/112, 122, 123, 124, 120

(56) References Cited

U.S. PATENT DOCUMENTS

| | | | |
|---|---|---|---|
| 4,565,540 | * 1/1986 | Orain | 464/111 |
| 4,786,270 | * 11/1988 | Iwasaki | 464/111 |
| 5,290,202 | * 3/1994 | Orain | 464/111 |
| 5,788,577 | * 8/1998 | Kadota et al. | 464/111 |

FOREIGN PATENT DOCUMENTS

| | | | |
|---|---|---|---|
| 429326 | * 5/1991 | (EP) | 464/111 |
| 288626 | * 11/1989 | (JP) | 464/111 |

* cited by examiner

*Primary Examiner*—Lynne H. Browne
*Assistant Examiner*—Aaron Dunwoody
(74) *Attorney, Agent, or Firm*—Arent Fox Kintner Plotkin & Kahn, PLLC (57) ABSTRACT

This slidable constant velocity universal joint comprises an outer joint member 1, and a tripod member 4 having a plurality of axially extending leg shafts 5 and outer rings 3 which are rotatably fitted on the leg shafts 5 and whose outer peripheries 3b are spherical. The tripod member 4 is received inside the outer joint member 1, and the outer rings 3 of the tripod member 4 are fitted in track grooves 2 in the outer joint member 1 so that they are slidable axially of the outer joint member. A sliding contact region S where relative sliding between the outer ring 3 and the leg shaft 5 in the leg shaft direction occurs is defined between the outer ring 3 and the leg shaft 5, and the outer ring 3 is allowed to swing around the axis of the leg shaft 5. The center of curvature O of the outer periphery of the outer ring 3 coincides with the sliding contact region S, thereby preventing the outer ring 3 from exhibiting unstable behavior before and after specific phases (0°, 180°).

9 Claims, 11 Drawing Sheets

SLIDABLE CONSTANT VELOCITY UNIVERSAL JOINT

BACKGROUND OF THE INVENTION

The present invention relates to a constant velocity universal joint which is used in the power transmission systems of automobiles and various industrial machines, and more particularly it relates to a slidable constant velocity universal joint which is capable of transmitting rotary motion at constant velocity even when driving and driven shafts to be joined together form an angle (operating angle) and which allows a relative axial movement between the driving and driven shafts.

Figure 9:
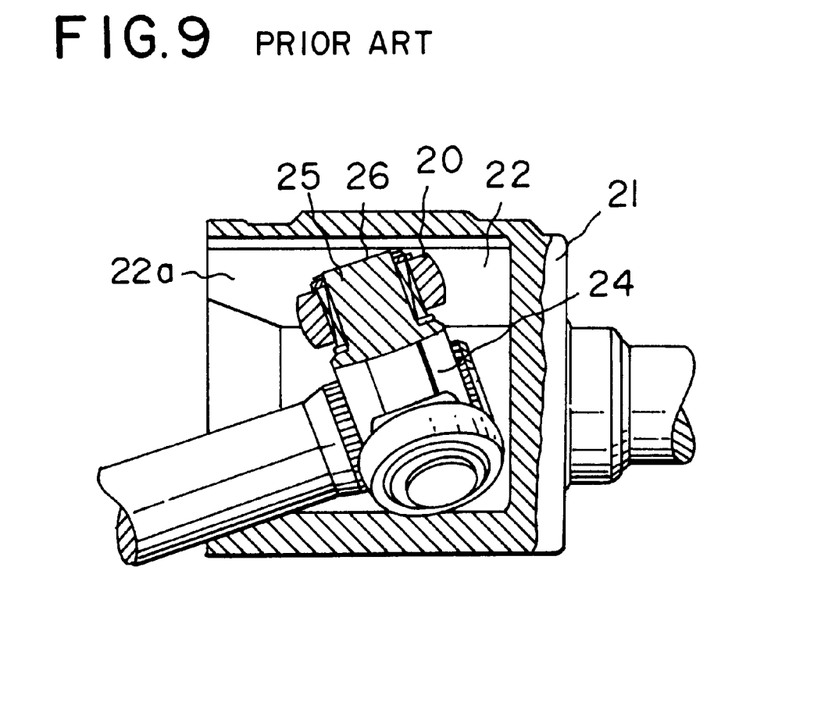
FIG. 9 is an axial sectional view of a conventional slidable constant velocity universal joint.
Figure 10:
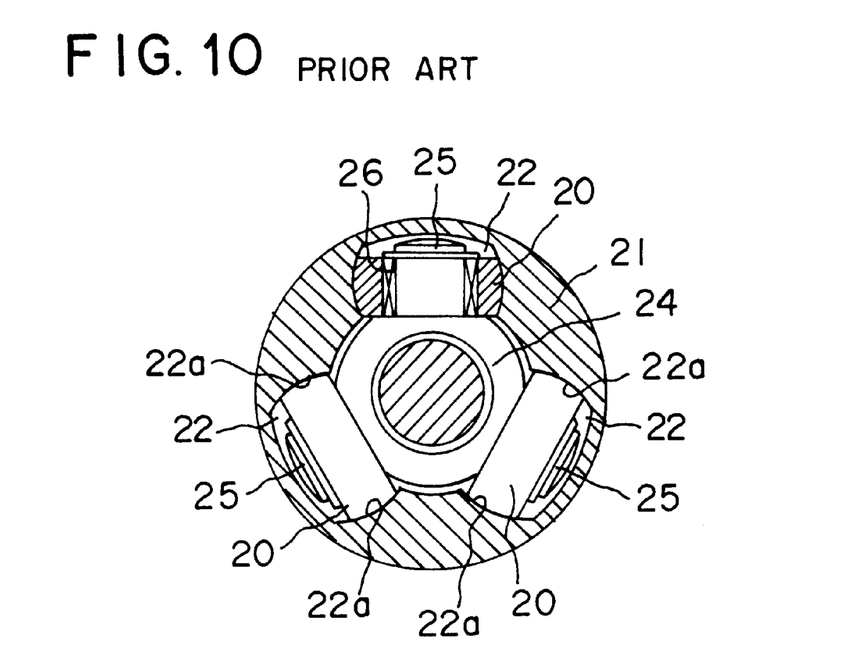
FIG. 10 is a radial sectional view of a conventional slidable constant velocity universal joint.

As for slidable constant velocity universal joints used in the transmission systems of automobiles, for example, there are some known forms of the so-called tripod type. One form, as shown in FIGS. 9 and 10, comprises an outer joint member 21 having three track grooves 22 formed in its inner peripheral surface and extending axially of the outer joint member, and a tripod member 24 having three radially extending leg shafts 25 with rollers 20 rotatably fitted on the cylindrical outer peripheral surfaces thereof through rolling elements 26, said tripod member 24 being inserted in the outer joint member 21 with said rollers 20 fitted in the track grooves 22. Each roller 20 is received in the associated track groove 22 such that it is engaged with the roller guide surfaces 22a of the associated track groove 22 opposed to each other circumferentially of the outer joint member, said roller 20 being capable of moving axially of the outer joint member while rotating around the axis of the leg shaft 25.

Figure 11:
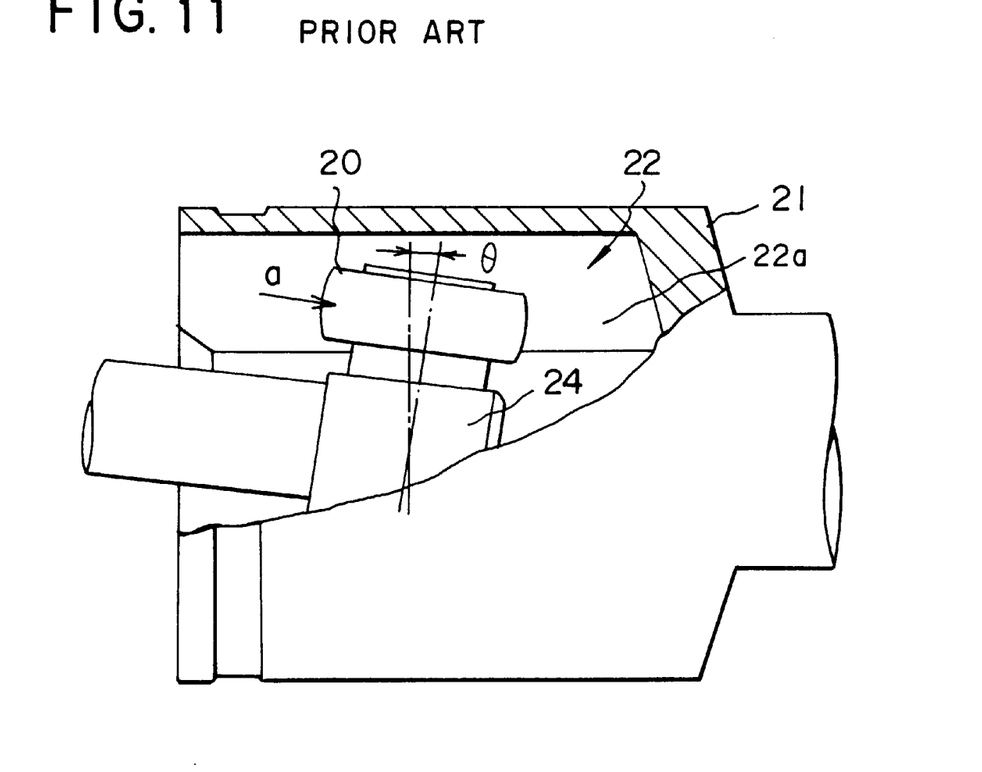
FIG. 11 is an axial sectional view of a conventional slidable constant velocity universal joint.
Figure 12:
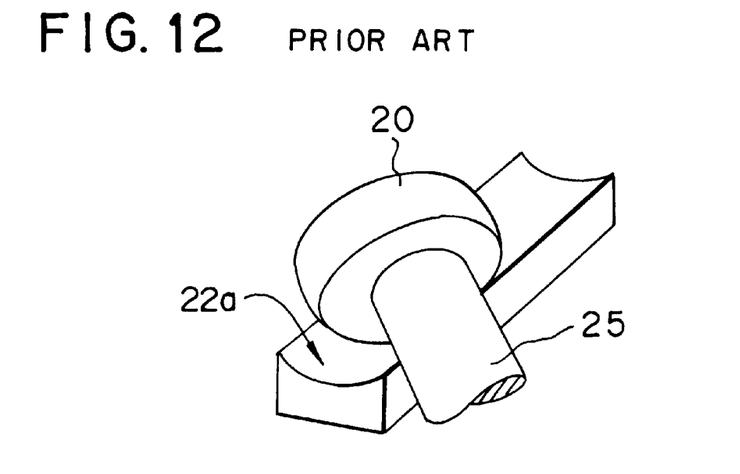
FIG. 12 is a perspective view showing the relation between a ring and a guide surface when they form a operating angle.

When the outer joint member 21 and the tripod member 24 form a operating angle θ as shown in FIG. 11 during torque transmission, the roller 20 and the roller guide surface 22a of the track groove 22 are in mutually slanting relation as shown in FIG. 12. In this case, the roller 20 tends to move by rolling in the direction of arrow a in FIG. 11, and since the track groove 22 has a cylindrical form extending parallel to the axis of the outer joint member, the roller 20 moves while being constrained by the track groove 22. As a result, slippage occurs between the roller guide surface 22a of the track groove 22 and the roller 20 to produce heat, and such slippage induces an axial thrust force. Such induced thrust causes vibrations of the car body and noise and therefore should desirably be minimized.

Figure 13:
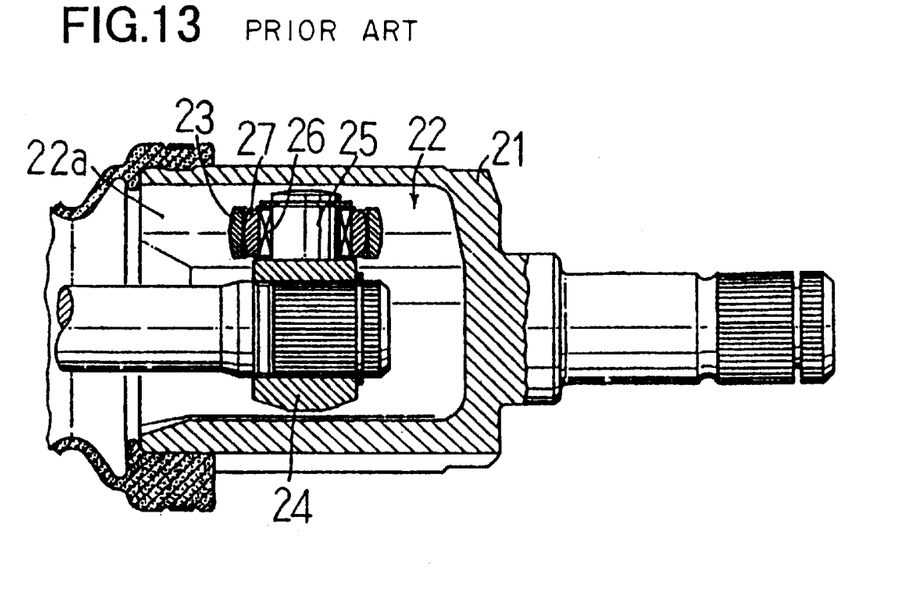
FIG. 13 is an axial sectional view of a conventional swing type slidable constant velocity universal joint.
Figure 14:
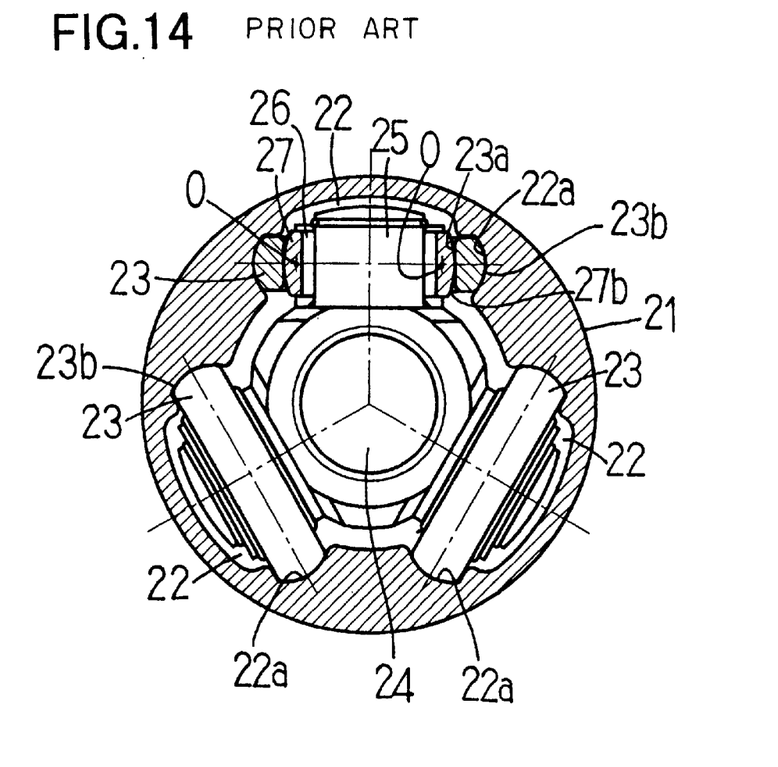
FIG. 14 is a radial sectional view of a conventional swing type slidable constant velocity universal joint.

There is known a tripod type constant velocity universal joint designed to reduce induced thrust and having rollers each constructed of a combination of inner and outer rings to make the joint oscillatable (Japanese Patent Publication 1991-1529). This joint, for example, as shown in FIGS. 13 and 14, includes inner rings 27 rotatably fitted on the cylindrical outer peripheral surfaces of the leg shafts 25 of the tripod member 24 through rolling elements 26, and outer rings 23 rotatably fitted on said inner rings 27. Each inner ring 27 has a truly spherical outer peripheral surface 27b around the axis of the leg shaft 25, and the cylindrical inner peripheral surface 23a of the outer ring 23 is rotatably fitted on said spherical outer peripheral surface 27b, whereby the outer ring 23 is made swingable with respect to the axis of the leg shaft 25. The outer rings 23 are received in the track grooves 22 of the outer joint member 21 and are capable of moving axially of the outer joint member while rolling on the roller guide surfaces 22a.

Figure 15:
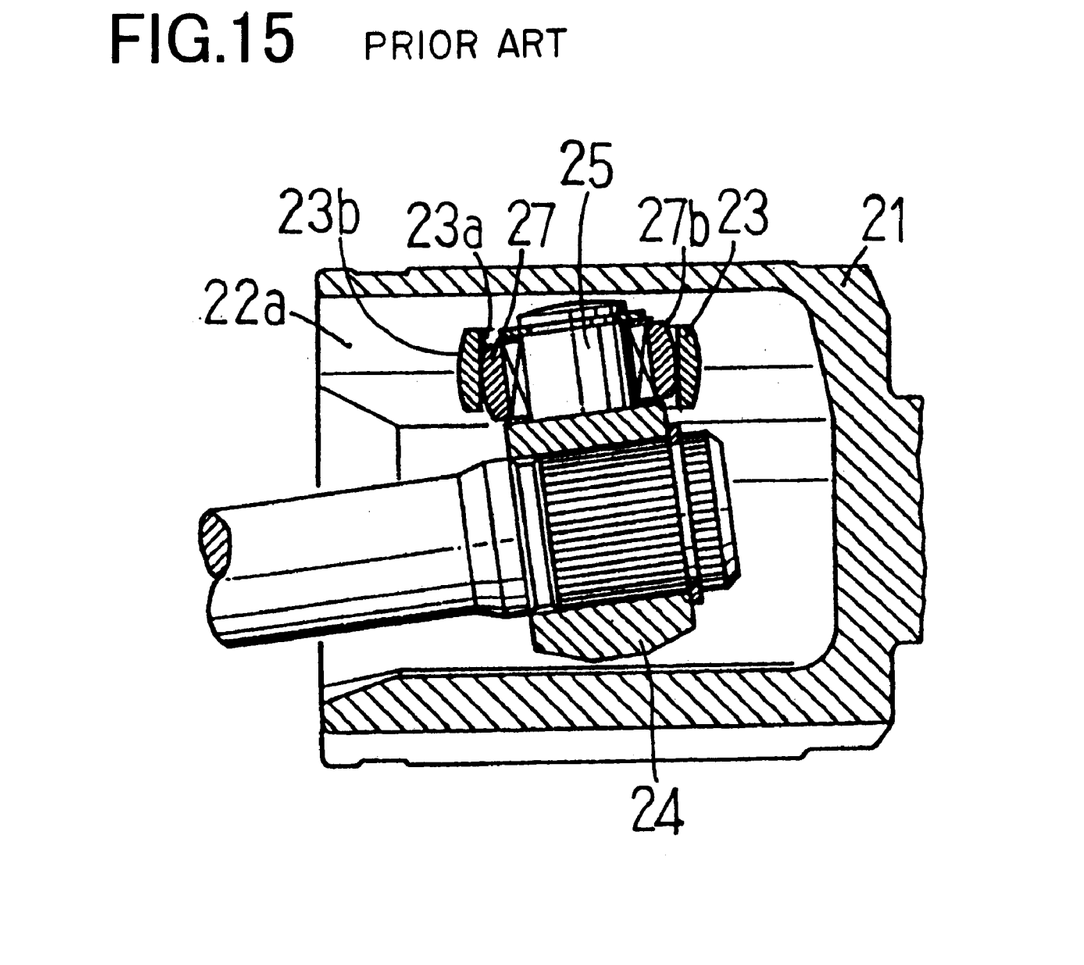
FIG. 15 is an axial sectional view of said joint when forming a operating angle.

In this oscillating or swing type, when the outer joint member 21 and the tripod member 24 form a operating angle during torque transmission as shown in FIG. 15, the outer ring 23 is inclined with respect to the axis of the leg shaft 25, when the spherical outer peripheral surface 27b of the inner ring 27 relatively slides on the cylindrical inner peripheral surface 23a of the outer ring 23. This relative movement between the inner and outer rings 27 and 23 causes the outer ring 23 to be guided parallel to the axis of the outer joint member 21 by the roller guide surfaces 22a of the outer joint member 21, so that the outer ring 23 correctly rolls on the roller guide surfaces 22a; thus, the sliding resistance on the roller guide surfaces 22a is reduced and the generation of the induced thrust force is suppressed.

In this connection, in said oscillating constant velocity universal joint, during torque transmission at a operating angle, the relative sliding movement between the outer and inner rings 23 and 27 results in a sliding friction component in the direction of the axis of the leg shaft 25 acting on the outer ring 23. This frictional force changes its direction of action through 180° at the ends of the stroke of said relative movement (when the phase angle is 0° and 180°, respectively). That is, immediately before the outer ring 23 reaches the stroke end shown in FIG. 16 (the direction of rotation of the tripod member 24 being taken as clockwise), said frictional force F acts radially inward. Immediately after it has reached the stroke end shown in FIG. 17, however, the frictional force F is reversed to act radially outward. In the conventional article, since the center of curvature O of the spherical outer peripheral surface 23b of the outer ring 23 is located more inward than the cylindrical inner peripheral surface 23a, a clockwise moment $M_F$ around the sphere center O due to said frictional force F acts on the outer ring 23 immediately before the latter reaches the stroke end (see FIG. 16), while a counterclockwise moment $M_F$ around the center of curvature O acts on the outer ring 23 immediately after the latter has reached the stroke end (see FIG. 17).

Further, not only does the frictional force F act on the outer ring 23 but also a turning force P attending the torque transmission acts perpendicular to the cylindrical inner peripheral surface 23a. This turning force P acts always in a fixed direction, without changing the direction as does said frictional force F, with the result that a counterclockwise moment $M_P$ around the sphere center O always acts on the outer ring 23.

Figure 16:
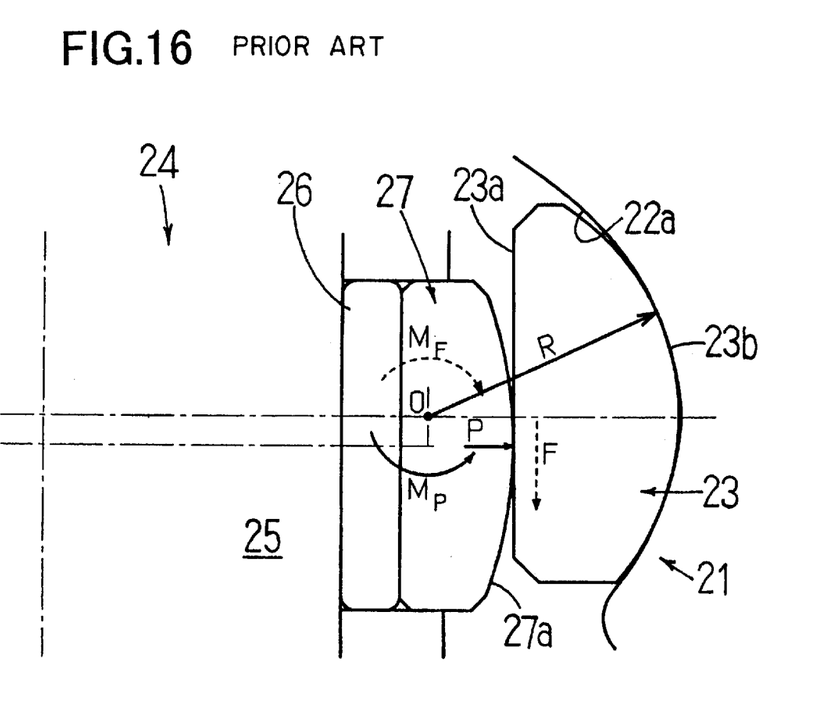
FIG. 16 is a radial plan view showing the outline of the structure of the swing type immediately before the phase angle assumes 0° and 180°, respectively.
Figure 17:
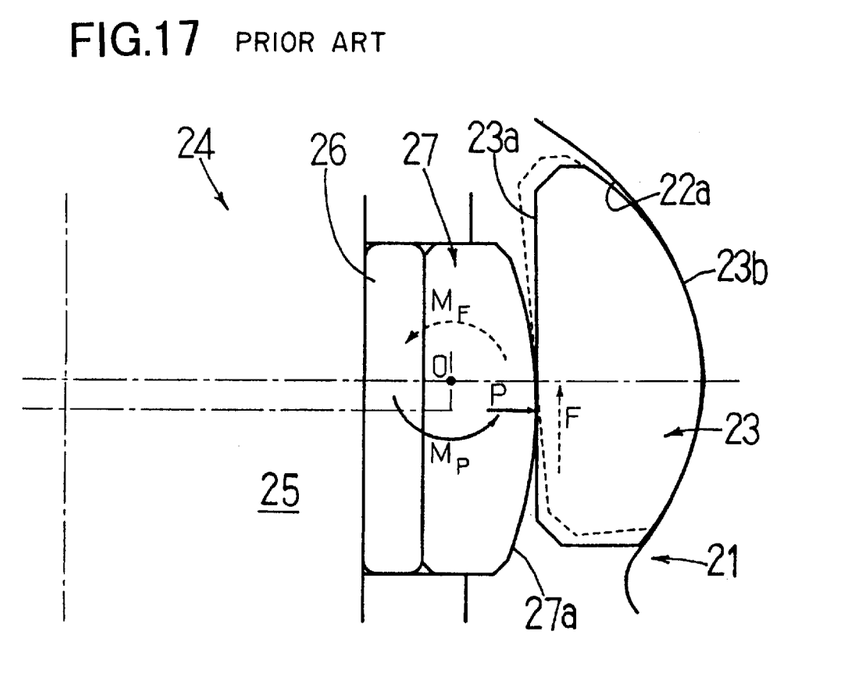
FIG. 17 is a radial plan view showing the outline of the structure of the swing type immediately after the phase angle has assumed 0° and 180°, respectively.

As is apparent from the foregoing description, the two moments $M_F$ and $M_P$ acting on the outer ring 23 act in opposite directions to cancel out each other immediately before the outer ring 23 reaches the stroke end (FIG. 16) but in the same direction immediately after it has passed by the stroke end (FIG. 17). Thus, the combined moment acting on the outer ring 23 suddenly changes before and after the stroke end, so that immediately after passing by the stroke end, the outer ring 23 inclines as shown in broken line in FIG. 17, a situation which could form a cause of generating an induced thrust or a sliding resistance.

There are various forms of said oscillating constant velocity universal joint as shown in FIGS. 18 through 21, and in each form, the center of curvature O of the spherical outer peripheral surface 23b of the outer ring 23 is deviated from the region S where a sliding movement in the direction of the leg shaft occurs; therefore, as in FIGS. 16 and 17, the outer ring 23 tends to exhibit unstable behavior at the stroke ends.

Accordingly, an object of the present invention is to prevent the outer ring from exhibiting such unstable behavior in specific phases.

SUMMARY OF THE INVENTION

To achieve the above object, the invention provide a slidable constant velocity universal joint comprising an outer joint member having a plurality of axial track grooves formed in the inner periphery thereof, a tripod member having a plurality of radially extending leg shafts and torque transmitting members which are rotatable about said leg shafts and whose outer peripheries are spherical, said tripod member being received in the inner periphery of said outer joint member, with the torque transmitting members of the tripod member being fitted in the track grooves of the outer joint member for sliding movement axially of the outer joint member, a sliding contact region defined between each torque transmitting member and each leg shaft where relative sliding occurs in the leg shaft direction, thereby allowing the torque transmitting members to swing around the axis of the leg shafts, wherein the center of curvature of the outer periphery of the torque transmitting member is positioned to coincide with said sliding contact region.

In this case, as a phase change takes place, sliding friction having a component directed in the leg shaft direction acts in the sliding contact region, and since its line of action coincides with the center of curvature of the outer peripheral surface of the torque transmitting member, there is no moment produced by the sliding frictional force to act on the torque transmitting member as there is with a conventional article. Therefore, a sudden change in the moment load is avoided and the behavior of the torque transmitting member at the stroke ends can be stabilized.

In addition, the term "leg shaft direction" means the direction of the axis of the leg shaft.

In the above joint, ① it is possible to dispose the inner ring inside the torque transmitting member and interpose the rolling elements between the inner ring and the leg shaft.

Figure 6:
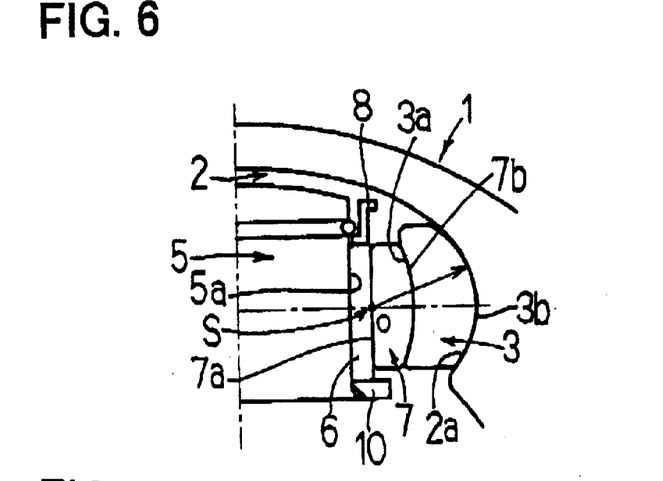
FIG. 6 is a radial sectional view showing another embodiment of the invention.
Figure 7:
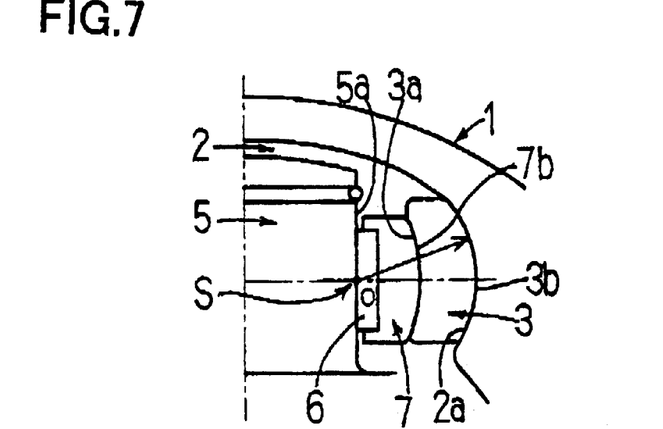
FIG. 7 is a radial sectional view showing another embodiment of the invention.

More particularly, it is possible to prevent the inner ring and the rolling elements from moving relative to the leg shaft in the leg shaft direction, the contact region between the inner peripheral surface of the torque transmitting member and the outer peripheral surface of the inner ring serving as said sliding contact region (see FIGS. 1 and 2), to prevent the inner ring from moving relative to the torque transmitting member in the leg shaft direction, and the rolling element from moving relative to the leg shaft in the leg shaft direction, the contact region between the rolling element and the inner peripheral surface of the inner ring serving as the sliding contact region (see FIG. 6), or to prevent the inner ring and the rolling element from moving relative to the torque transmitting member in the leg shaft direction, the contact region between the rolling element and the outer peripheral surface of the leg shaft serving as said sliding contact region (see FIG. 7).

Further, in the above joint, ② it is possible to dispose the rolling element inside the torque transmitting member and interpose the inner ring between the rolling element and the leg shaft.

Figure 8:
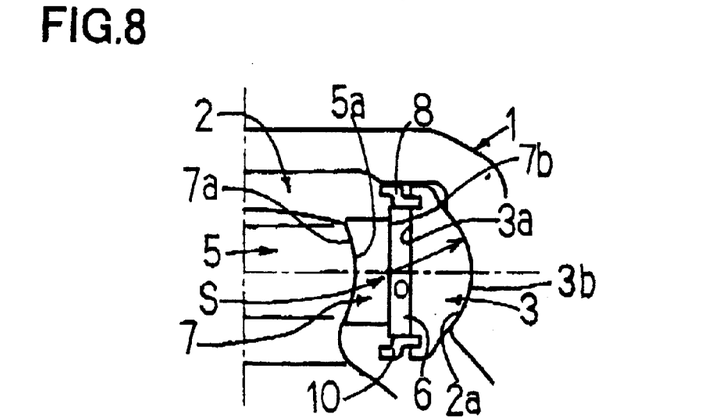
FIG. 8 is a radial sectional view showing another embodiment of the invention.

More particularly, it is possible to prevent the inner ring and the rolling element from moving relative to the torque transmitting member in the leg shaft direction, the contact region between the inner peripheral surface of the inner ring and the outer peripheral surface of the leg shaft serving as said sliding contact region (see FIGS. 4 and 5), or to prevent the inner ring from moving relative to the leg shaft in the leg shaft direction, and the rolling element from moving relative to the torque transmitting member in the leg shaft direction, the contact region between the rolling element and the outer peripheral surface of the inner ring serving as said sliding contact region (see FIG. 8).

Figure 3:
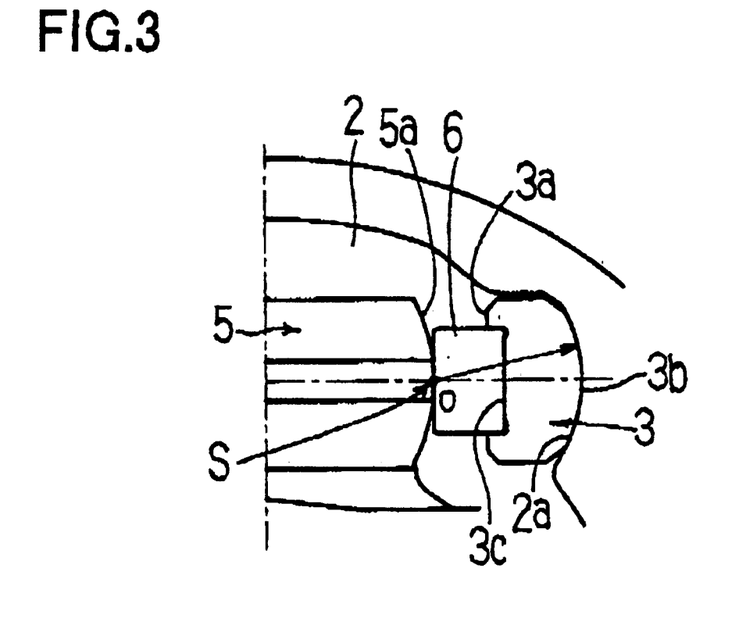
FIG. 3 is a radial sectional view showing another embodiment of the invention.

Further, in the above joint, ③ it is possible to interpose the rolling element between the torque transmitting member and the leg shaft, and prevent the rolling element from moving relative to the torque transmitting member in the leg shaft direction, the contact region between the outer peripheral surface of the leg shaft and the outer peripheral surface of the rolling element serving as said sliding contact region (FIG. 3).

Thus, according to the present invention, since the center of curvature of the spherical outer peripheral surface of the torque transmitting member is positioned to coincide with the point of action of a sliding frictional force produced between the outer joint member and the leg shaft during torque transmission when a operating angle is formed, no moment based on a sliding frictional force acts on the torque transmitting member. Therefore, there is no sudden change in the direction of a moment acting on the torque transmitting member before and after the stroke ends, and it is possible to prevent the torque transmitting member from changing its attitude and reduce the induced thrust and sliding resistance.

DESCRIPTION OF THE PREFERRED EMBODIMENTS

Embodiments of the invention will now be described with reference to FIGS. 1 through 8 and FIGS. 18 through 21.

Figure 1:
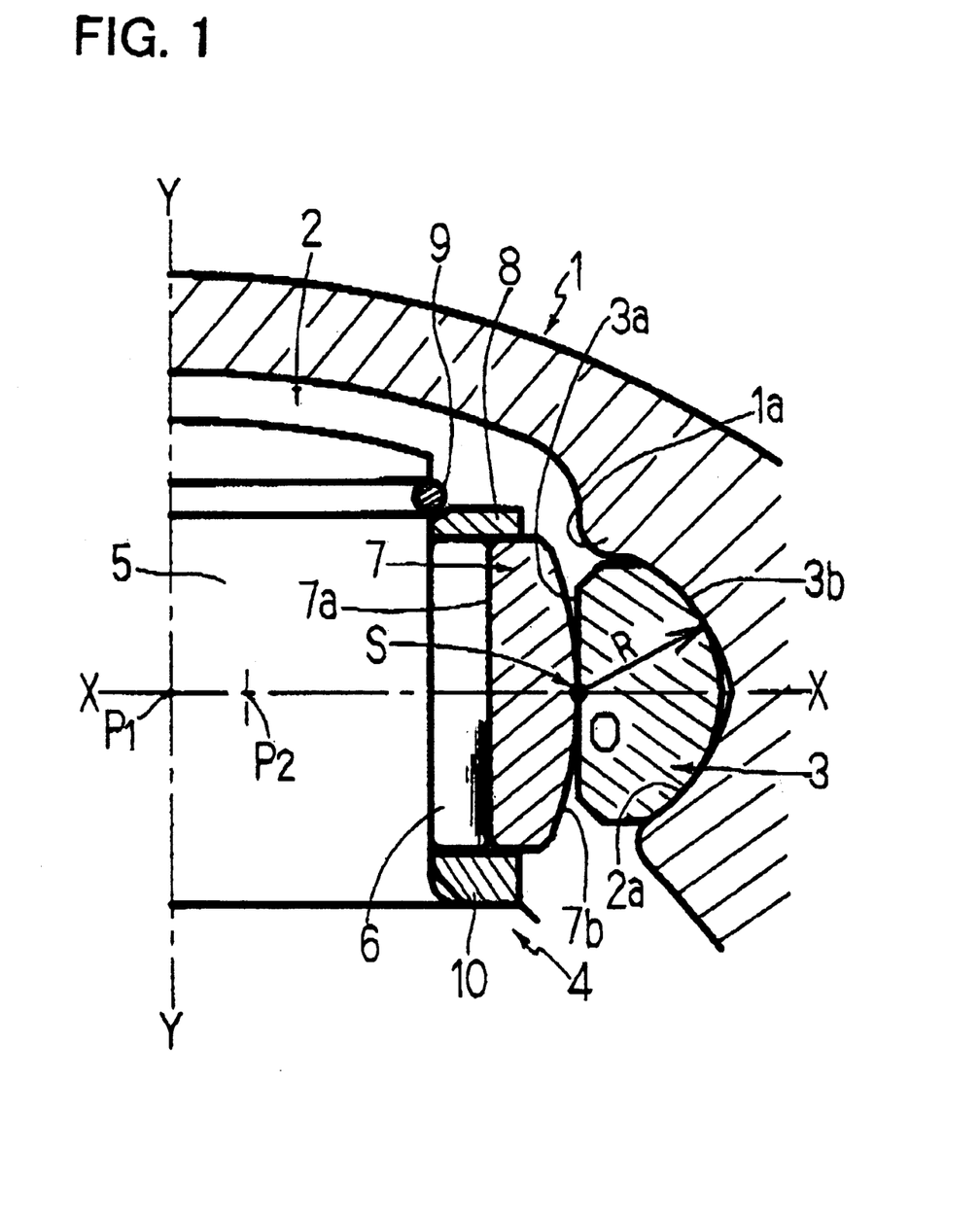
FIG. 1 is an enlarged radial sectional view of a slidable constant velocity universal joint according to the present invention.

In FIG. 1, a tripod joint has an outer joint member 1 to be connected to one of two shafts to be joined together, and a tripod member 4 to be connected to the other shaft. The outer joint member 1 has a roughly cup-shaped external appearance and has three axially extending track grooves 2 formed in the inner peripheral surface thereof at equal circumferential intervals. The tripod member 4 has three radially extending leg shafts 5 at equal circumferential intervals, with an inner ring 7 rotatably fitted on each leg shaft 5 through a plurality of rolling elements, e.g., needle rollers 6. The inner ring 7 is held in position at one end by a slip-off preventive ring 8 and a snap ring 9 mounted on the front end of the leg shaft 5 and at the other end by a washer 10 disposed on the shoulder of the tripod member 4, thus, movement of the inner ring relative to the leg shaft 5 in the direction of the axis of the leg shaft 5 (hereinafter referred to as the leg shaft direction) is prevented. The inner peripheral surface 7a of the inner ring 7 is a cylindrical surface, while the outer peripheral surface 7b thereof is an outwardly spherical surface. In this embodiment, the generatrix of the spherical outer peripheral surface 7b is an arc with its center located at $P_2$ which is offset radially outward by a predetermined amount from the radial center $P_1$ of the inner ring 7.

The outer ring 3, which serves as a torque transmitting member for transmitting torque to the outer joint member 1, is rotatably fitted in the spherical outer peripheral surface 7b of the inner ring 7. In this embodiment, the inner peripheral surface 3a of the outer ring 3 is a cylindrical surface, so that the cylindrical inner peripheral surface 3a and the spherical outer peripheral surface 7b of the inner roller 7 come into linear contact, whereby relative swing displacement between them around the axis Y—Y of the leg shaft 5 is allowed. The outer peripheral surface 3b of the outer ring 3 is outwardly spherical, and its center of curvature O coincides with the contact region S between the cylindrical inner peripheral surface 3a of the outer roller 3 and the spherical outer peripheral surface 7b of the inner ring 7.

Each track groove 2 has guide surfaces 2a at circumferentially opposed positions. The guide surface 2a is composed of two cylindrical surfaces whose curvatures are greater than the radius of curvature R of the spherical outer peripheral surface 3b of the outer ring 3, and the spherical outer peripheral surface 3b of the outer ring 3 is in angular contact with the guide surface 2a at two points. This angular contact allows the outer ring 3 to be guided axially of the outer joint member 1. The shape of the guide surface 2a of the track groove 2 may, besides the Gothic arch consisting of two cylindrical surfaces as described above, be a V-shape.

The radial center $P_1$ of the inner ring 7, the center of curvature $P_2$ of the spherical outer peripheral surface 7b, and the center of curvature O of the spherical outer peripheral surface 3b of the outer ring 3 are all located on the centerline X—X of the guide surface 2a of the track groove 2 when the operating angle is 0°, which centerline extends radially of the leg shaft through the center of the distance between the regions of contact with the spherical outer peripheral surface 3b.

As described above, in the present invention, the center of curvature O of the spherical outer peripheral surface 3b of the outer ring 3 is positioned to coincide with the contact region S between the cylindrical inner peripheral surface 3a of the outer roller 3 and the spherical outer peripheral surface 7b of the inner ring 7. In the contact region S between the cylindrical inner peripheral surface 3a and the spherical outer peripheral surface 7b, a sliding frictional force (F: see FIGS. 16 and 17) having a component in the direction of the axis of the leg shaft 5 is produced during torque transmission at a operating angle, the point of action (the sliding contact region S) of this sliding frictional force coincides with the center of curvature O of the spherical outer peripheral surface 3b of the outer ring 3; therefore, there is no moment M, due to the sliding frictional force F acting on the outer ring 3 as in the conventional arrangement. Therefore, there is no sudden change in the direction of the moment acting on the outer ring 3 before and after the stroke end. Thus, it is possible to prevent the outer ring 3 from changing its attitude and to reduce the induced thrust and sliding resistance.

In the above description, the inner peripheral surface 3a of the outer ring 3 has been taken to be a cylindrical surface; however, said inner peripheral surface 3a may be a conical taper surface decreasing in diameter toward the front end of the leg shaft 5, in which case a load component is produced in the slide contact region S to urge the outer roller 3 toward the front end of the leg shaft, thereby making it possible to further reduce the axial sliding resistance and induced thrust.

Figure 2:
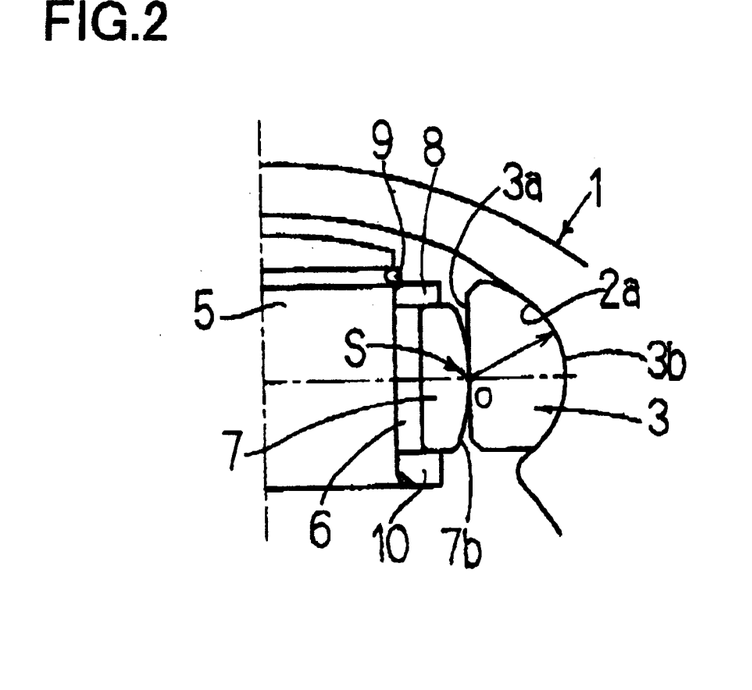
FIG. 2 is a radial sectional view showing another embodiment of the invention.
Figure 18:
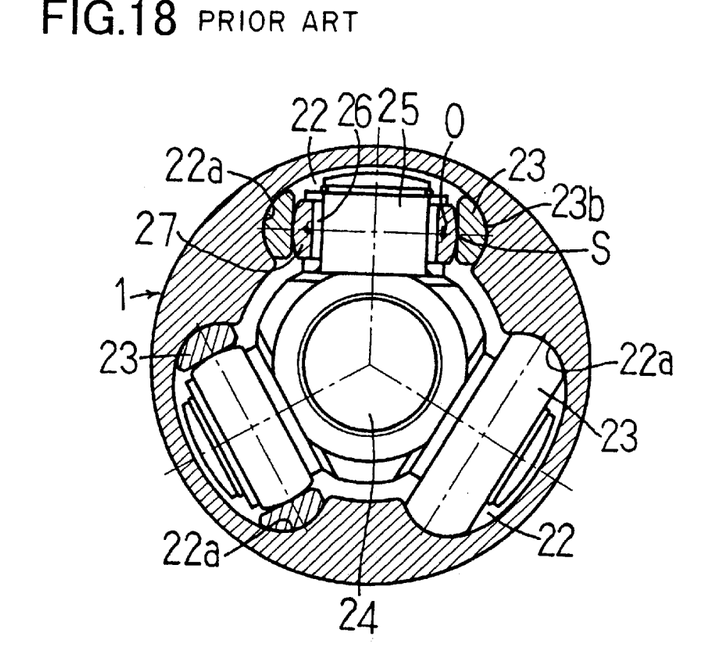
FIG. 18 is a radial sectional view showing an example of a conventional slidable constant velocity universal joint.

FIG. 2 shows the present invention applied to the conventional joint shown in FIG. 18. The difference between this joint and the joint of FIG. 1 is that the flange 1a (see FIG. 1) adjacent the guide surface 2a of the outer joint member 1 is omitted, thereby reducing the number of regions of contact between the outer ring 3 and the outer joint member 1, further reducing the induced thrust and sliding resistance. In this arrangement, it is in the contact region S between the cylindrical inner peripheral surface 3a of the outer ring 3 and the spherical outer peripheral surface 7b of the inner ring 7 that sliding between the outer joint member 1 and the leg shaft 5 in the leg shaft direction occurs, as in FIG. 1; thus, the behavior of the outer ring 3 at the stroke ends can be stabilized by positioning the center of curvature O of the spherical outer peripheral surface 3b of the outer ring 3 to coincide with the sliding contact region S.

Figure 19:
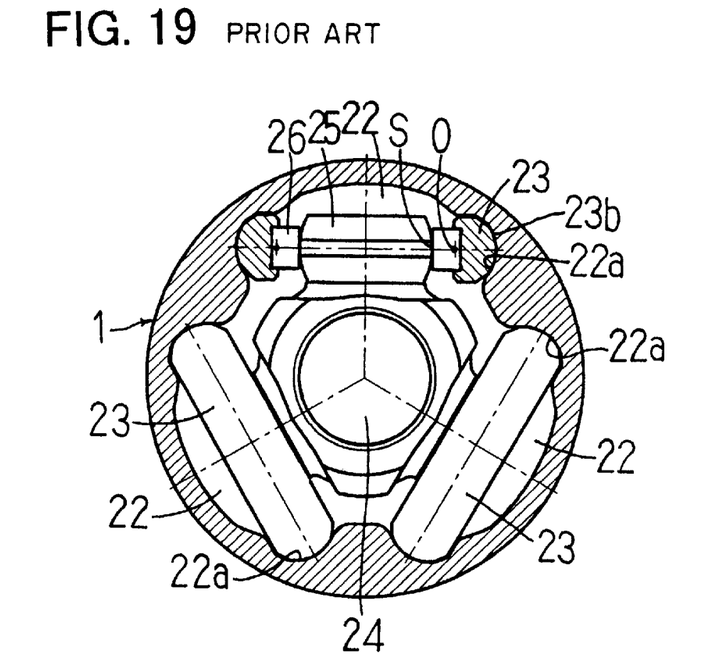
FIG. 19 is a radial sectional view showing an example of a conventional slidable constant velocity universal joint.

FIG. 3 shows the present invention applied to a joint shown in FIG. 19. This joint includes rolling elements (for example, cylindrical rollers 6) interposed between a ring 3 which serves as a torque transmitting member and a leg shaft 5 (not having an inner ring). The rolling elements 6 are received in a recess 3c formed in the cylindrical inner peripheral surface 3a of the ring 3 and are thereby prevented from moving relative to the ring 3 in the leg shaft direction. In this joint, the contact region between the outer peripheral surface 5a, which is made outwardly spherical, of the leg shaft 5 and the outer peripheral surface of rolling element 6 provides said sliding contact region S. Therefore, the same effects as those described above can be obtained by positioning the center of curvature O of the spherical outer peripheral surface 3b of the ring 3 to coincide with the sliding contact region S.

Figure 4:
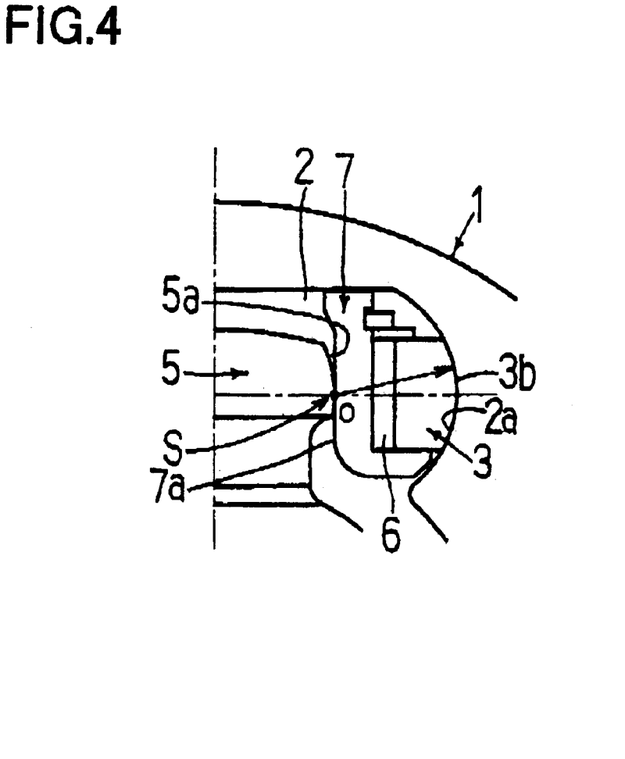
FIG. 4 is a radial sectional view showing another embodiment of the invention.
Figure 5:
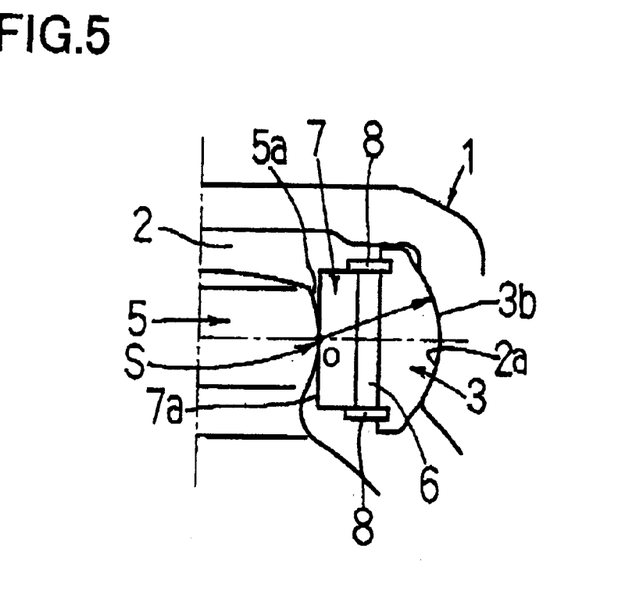
FIG. 5 is a radial sectional view showing another embodiment of the invention.
Figure 20:
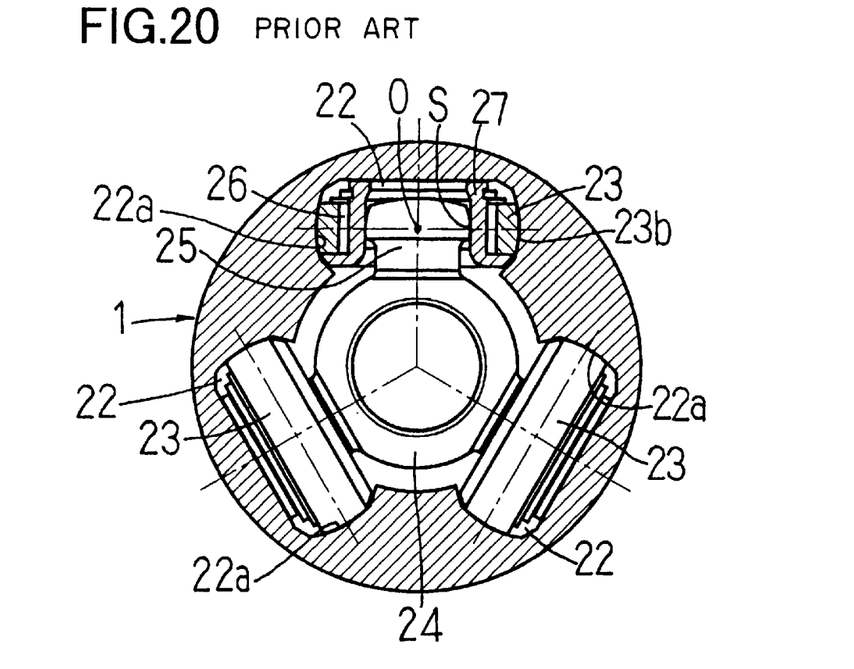
FIG. 20 is a radial sectional view showing an example of a conventional slidable constant velocity universal joint.
Figure 21:
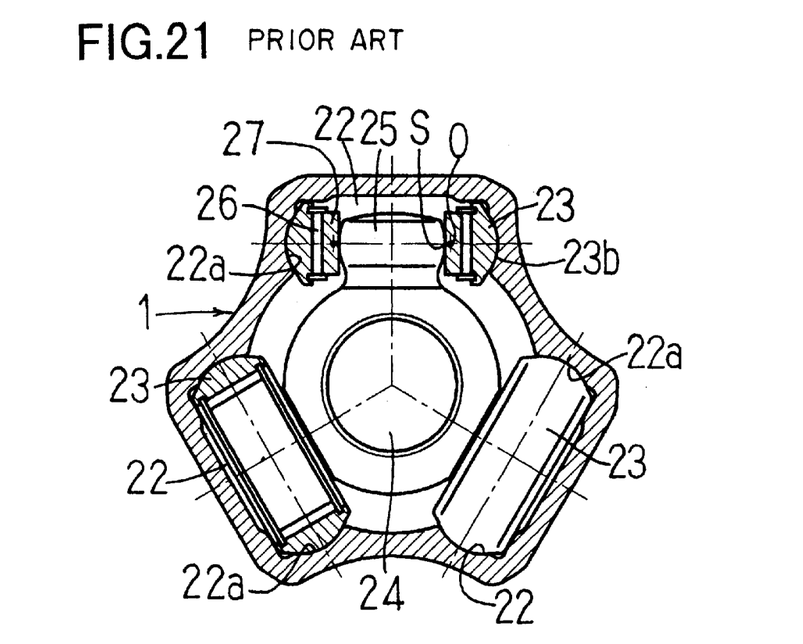
FIG. 21 is a radial sectional view showing an example of a conventional slidable constant velocity universal joint.

FIGS. 4 and 5 show the present invention applied to joints shown in FIGS. 20 and 21. In these joints, rolling elements (for example, needle rollers 6) are disposed on the inner periphery of the outer ring 3 and an inner ring 7 is disposed between the rolling elements 6 and the leg shaft 5. Thus, the inner ring 7 and the rolling elements 6 are prevented from moving relative to the outer ring 3 in the leg shaft direction. In FIG. 4, the movement of the inner ring 7 relative to the outer ring 3 in the leg shaft direction is prevented by contacting the opposite ends of the inner ring 7 with the track groove 2, while in FIG. 5, the inner ring 7 and the rolling elements 6 are prevented from moving relative to the outer ring 3 in the leg shaft direction by integrally engaging their opposite ends with the outer ring 3 through locking members 8. In either construction, the contact region between the cylindrical inner peripheral surface 7a of the inner ring 7 and the leg shaft outer peripheral surface 5a which is made outwardly spherical serves as said sliding contact region S. The center of curvature O of the spherical outer peripheral surface 3b of the outer ring 3 is positioned to coincide with this sliding contact region S.

FIGS. 6 and 7 show constructions in which, as in FIGS. 1 and 2, there are rolling elements 6 (for example, needle rollers), an inner ring 7, and an outer ring 3, disposed in the order mentioned as seen radially outward of the leg shaft 5. These constructions differ from those shown in FIGS. 1 and 2 in that the outer peripheral surface 7b of the inner ring 7 is made outwardly spherical and the inner peripheral surface 3a of the outer ring 3 is made inwardly spherical, the two surfaces being in spherical contact. In each of the constructions in FIGS. 6 and 7, the spherical contact prevents the inner ring 7 from moving relative to the outer ring 3 in the leg shaft direction. In FIG. 6, movement of the rolling elements 6 relative to the leg shaft 5 is prevented by pair of locking members 8 and 10, while in FIG. 7, movement of the rolling elements 6 relative to the inner ring 3 is prevented; therefore, the two construction differ in the position of the sliding contact region S. That is, in the construction of FIG. 6, a sliding contact region S is formed between the inner peripheral surface 7a of the inner ring 7 and the rolling element 6, while in FIG. 7, a sliding contact region S is formed between the rolling element 6 and the outer peripheral surface 5a of the leg shaft 5. In either case, the center of curvature O of the spherical outer peripheral surface 3b of the outer ring 3 is positioned to coincide with the sliding contact region S.

FIG. 8 shows a construction in which, as in FIGS. 4 and 5, there are an inner ring 7, rolling elements 6 (for example, needle rollers), and an outer ring 3, disposed in the order mentioned as seen radially outward of the leg shaft 5, but which differs from those shown in FIGS. 4 and 5 in that the outer peripheral surface 5a of the leg shaft 5 is made outwardly spherical and the inner peripheral surface 7a of the inner ring 7 is made inwardly spherical, the two surfaces being in spherical contact. In this construction, the spherical contact prevents the inner ring 7 from moving relative to the leg shaft 5 in the leg shaft direction, and movement of the rolling elements 6 relative to the outer ring 3 in the leg shaft direction is prevented by a pair of locking members 8 and 10; therefore, the contract region between the rolling element 6 and cylindrical outer peripheral surface 7b of the inner ring 7 serves as a sliding contact region S. The center of curvature O of the spherical outer peripheral surface 3b of the outer ring 3 is positioned to coincide with this sliding contact region S.

What is claimed is:

1. A slidable constant velocity universal joint comprising an outer joint member having a plurality of axial track grooves formed in the inner periphery thereof, a tripod member having a plurality of radially extending leg shafts and torque transmitting members which are rotatable about said leg shafts and whose outer peripheries are spherical, said tripod member being received in the inner periphery of said outer joint member, with the torque transmitting members of the tripod member being fitted in the track grooves of the outer joint member for sliding movement axially of the outer joint member, a sliding contact region defined between each torque transmitting member and each leg shaft where relative sliding occurs in the leg shaft direction, thereby allowing the torque transmitting members to swing around the axis of the leg shafts, wherein the center of curvature of the outer periphery of the torque transmitting member is positioned to coincide with said sliding contact region.

2. A slidable constant velocity universal joint as set forth in claim 1, wherein an inner ring is disposed inside the torque transmitting member and a rolling element is interposed between the inner ring and the leg shaft.

3. A slidable constant velocity universal joint as set forth in claim 2, wherein the inner ring and the rolling element are prevented from moving relative to the leg shaft in the leg shaft direction and the contact region between the inner peripheral surface of the torque transmitting member and the outer peripheral surface of the inner ring serves as said sliding contact region.

4. A slidable constant velocity universal joint as set forth in claim 2, wherein the inner ring is prevented from moving relative to the torque transmitting member in the leg shaft direction, and the rolling element is prevented from moving relative to the leg shaft in the leg shaft direction, and the contact region between the rolling element and the inner peripheral surface of the inner ring serves as said sliding contact region.

5. A slidable constant velocity universal joint as set forth in claim 2, wherein the inner ring and the rolling element are prevented from moving relative to the torque transmitting member in the leg shaft direction, and the contact region between the rolling element and the outer peripheral surface of the leg shaft serves as said sliding contact region.

6. A slidable constant velocity universal joint as set forth in claim 1, wherein the rolling element is disposed inside the torque transmitting member and the inner ring is interposed between the rolling element and the leg shaft.

7. A slidable constant velocity universal joint as set forth in claim 6, wherein the inner ring and the rolling element are prevented from moving relative to the torque transmitting member in the leg shaft direction, and the contact region between the inner peripheral surface of the inner ring and the outer peripheral surface of the leg shaft serves as said sliding contact region.

8. A slidable constant velocity universal joint as set forth in claim 6, wherein the inner ring is prevented from moving relative to the leg shaft in the leg shaft direction, and the rolling element is prevented from moving relative to the torque transmitting member in the leg shaft direction, and the contact region between the rolling element and the outer peripheral surface of the inner ring serves as said sliding contact region.

9. A slidable constant velocity universal joint as set forth in claim 1, wherein the rolling element is interposed between the torque transmitting member and the leg shaft, the rolling element is prevented from moving relative to the torque transmitting member in the leg shaft direction, and the contact region between the outer peripheral surface of the leg shaft and the rolling element serves as said sliding contact region.

* * * * *